(12) United States Patent
Ma

(10) Patent No.: US 6,352,350 B1
(45) Date of Patent: Mar. 5, 2002

(54) HIGH EFFICIENCY FLAT ILLUMINATOR FOR LIQUID CRYSTAL MICRO-DISPLAY

(75) Inventor: Guolin Ma, Milpitas, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/585,200

(22) Filed: Jun. 1, 2000

(51) Int. Cl.$^7$ .............................. F21V 9/14; F21V 13/08
(52) U.S. Cl. ............................ 362/19; 362/31; 349/63; 349/65
(58) Field of Search .................. 362/19, 26, 27, 362/31, 558–561; 349/61–65; 359/483, 487, 488

(56) References Cited

U.S. PATENT DOCUMENTS

| | | | |
|---|---|---|---|
| 5,099,343 A | * 3/1992 | Margerum et al. | 349/64 |
| 5,587,816 A | * 12/1996 | Gunjima et al. | 349/62 |
| 5,729,311 A | 3/1998 | Broer et al. | 349/65 |
| 5,808,709 A | * 9/1998 | Davis et al. | 349/65 |
| 5,808,713 A | 9/1998 | Broer et al. | 349/98 |
| 6,005,720 A | 12/1999 | Watters et al. | 359/633 |
| 6,048,071 A | * 4/2000 | Sawayama | 362/31 |
| 6,108,059 A | * 8/2000 | Yang | 349/65 |
| 6,239,851 B1 | * 5/2001 | Hatazawa et al. | 349/62 |

* cited by examiner

Primary Examiner—Alan Cariaso

(57) ABSTRACT

An illumination system for a flat panel micro-display device includes a flat panel edge lit lightguide having a polarizing layer on a major surface and a polarization rotator and reflector proximate to an edge face of the lightguide. The polarization rotator changes the polarization state of light that is initially reflected from the polarization layer to a desired polarization state from an undesired polarization state and the reflector reflects the light back to the polarization layer. The rotated and reflected light propagating within the lightguide passes though the polarizing layer and illuminates a LCD panel of the micro-display. The combination of the polarization rotator and the reflector provide a controlled system in which most of the initially reflected light is utilized to illuminate the LCD panel. In an embodiment, the polarizing layer is a polarizing film that passes P polarized incoming light and reflects S polarized incoming light, the polarization rotator is a quarter wave plate that rotates light by a quarter wave, and the reflector is a mirror that reflects light without changing the polarization state of the light.

32 Claims, 4 Drawing Sheets

HIGH EFFICIENCY FLAT ILLUMINATOR FOR LIQUID CRYSTAL MICRO-DISPLAY

FIELD OF THE INVENTION

The invention relates to lighting systems for flat panel displays, and more particularly to lighting systems that emit polarized light to a liquid crystal micro-display.

BACKGROUND OF THE INVENTION

Flat panel micro-displays are utilized in devices such as video cameras, hand-held computers, and wireless telephones. A common flat panel micro-display technology is the liquid crystal display (LCD) technology. As is known in the field of LCDs, an integral part of a LCD is the lighting system that provides light to the LCD pixels.

Because LCD displays are often utilized in battery operated portable devices, an important consideration in all of the lighting technologies is the conservation of energy and the efficient use of generated light. One technology for lighting a micro-display that utilizes a reflective LCD panel is disclosed in U.S. Pat. No. 6,005,720 issued to Watters et al. (hereinafter Watters). In Watters, light from an off-axis light source is projected through a first prism onto a reflective LCD panel and then through a second prism. Although the lighting system works well, light having the undesired polarization component is not utilized to illuminate the reflective LCD panel. In addition, the prisms required to direct and polarize the light add substantial thickness to the overall micro-display package.

Another technology for illuminating a transmissive micro-display involves an edge lit flat illuminator. Edge lit flat illumination involves injecting light along the edge of a flat transparent panel, such as glass or plastic slab, and causing as much of the light as possible to illuminate the surface of the transmissive LCD panel.

Some edge lit flat illumination techniques provide unpolarized light to a transmissive LCD panel. However, because transmissive LCD panels are designed to transmit only one polarization component of light, other polarization components of the unpolarized light are absorbed by the LCD panel. Absorption of the other polarization components of the unpolarized light by the LCD panel reduces the brightness level that can be achieved by the micro-display and causes unwanted heating of the reflective LCD panel.

Edge lit flat illumination techniques are known that provide polarized light to a transmissive LCD panel. FIG. 1 represents a flat panel micro-display system that includes a transmissive LCD panel 104 located above an edge lit flat panel illumination system 106. The edge lit flat panel illumination system includes a light source 108, a flat panel lightguide 110, a polarizing layer 112, and reflective layer 114. The polarizing layer transmits light of one polarization state and reflects light of the other polarization state. The light source injects unpolarized light into the flat panel lightguide and light that is incident on the polarizing layer is either passed through the polarizing layer or reflected within the lightguide depending on the polarization state of the incident light. Typically, half of the light that is incident on the polarizing layer has a polarization state that is passed through the polarizing layer as indicated by the dashed line 130 and half of the light that is incident on the polarizing layer has a polarization state that is reflected by the polarizing layer as indicated by the solid line 132. The linearly polarized light that passes through the polarizing layer is then reflected by the reflective layer 114. The reflected light then passes up through the lightguide and illuminates the transmissive LCD panel. Light passed by the transmissive LCD panel can be seen from the viewing direction.

The light that is initially reflected by the polarizing layer 112 continues to propagate through the lightguide 110 as shown by the solid line 132 in FIG. 1 and is not utilized to illuminate the LCD panel 104. Eventually, the unused light exits the opposite edge of the waveguide or is dissipated within the lightguide. Because half of the initially generated light is not passed by the polarization layer to illuminate the LCD panel, the energy efficiency and light use efficiency of the micro-display described with reference to FIG. 1 are low.

One known improvement to the edge lit flat panel illumination system of FIG. 1 involves adding a depolarizing reflector to the edge of the flat panel lightguide that is opposite the light source. Referring to FIG. 2, light having the unwanted polarization state is initially reflected by the polarization layer 212 and propagates through the flat panel lightguide 210 until the light is incident on the depolarizing reflector 216 that is located at the opposite edge face of the lightguide. The depolarizing reflector depolarizes the light having the unwanted polarization state thereby causing a portion of the reflected light to change to the desired polarization state. The portion of the reflected light that is changed to the desired polarization state is then passed by the polarization layer as shown by dashed line 234 and reflected by the reflector 214 to illuminate the LCD panel 204. While this technique works well to improve the efficiency of the micro-display, there is still a substantial portion of light that does not change polarization state to the desired polarization state and therefore is not utilized to illuminate the reflective LCD panel.

In view of the need for more efficient lighting systems for micro-displays and in view of the prior art limitations, what is needed is a lighting system and method with improved efficiency.

SUMMARY OF THE INVENTION

An illumination system and method involve utilizing a polarization rotator and a reflector with a flat panel edge lit waveguide to rotate the polarization state of light that is initially reflected from a polarizing layer. The polarization rotator changes the polarization state of the initially reflected light from an undesired polarization state to a desired polarization state and the reflector reflects the portion of light back to the polarization layer where it is passed to illuminate a LCD panel. The combination of the polarization rotator and the reflector provide a controlled system in which most of the initially generated light is utilized to illuminate the LCD panel.

An embodiment of an illumination system includes a lightguide, a polarization system, and polarization/reflector combination that is integrated with the lightguide. In the embodiment, the lightguide has a first major surface opposite a second major surface and a first edge face opposite a second edge face, with the first edge face being positioned to receive light from a light source. The polarizing system, which is proximate to the second major surface of the lightguide, passes a first portion of the light having a desired polarization state to a display panel and reflects a second portion of said light having an undesired polarization state. The polarization rotator/reflector combination reflects the second portion of the light at the second edge face and rotates the polarization state of the second portion of light from the undesired polarization state to the desired polarization state, wherein the second portion of the light having the desired polarization state is incident on the polarizing system and is passed to the display panel.

A method for illuminating a display device involves inputting light into a first edge face of a lightguide, with the lightguide having a first major surface opposite a second major surface, passing a first portion of the light having a desired polarization state through a polarization system that is proximate to the first major surface of the lightguide, reflecting a second portion of the light having an undesired polarization state from the polarization system that is proximate to the first major surface of the waveguide, passing the second portion of the light through a polarization rotator to rotate the polarization state of the second portion of the light to the desired polarization state from the undesired polarization state, reflecting the second portion of the light at a second edge face that is opposite the first edge face, and passing the second portion of the light through the polarization system after the polarization state of the second portion of light has been rotated to the desired polarization state and after the second portion of the light has been reflected at the second edge face.

An advantage of the illumination system and method is that all, or nearly all, of the light that is initially generated from a light source is utilized to illuminate the LCD panel, thereby increasing the light and energy efficiency of the illumination system. Another advantage of the illumination system and method is that a LCD panel can be illuminated with a flat panel lightguide, which allows the thickness of a micro-display package to be thinner than off-axis micro-displays that utilize prism systems to illuminate a LCD panel.

DETAILED DESCRIPTION OF THE INVENTION

Figure 1:
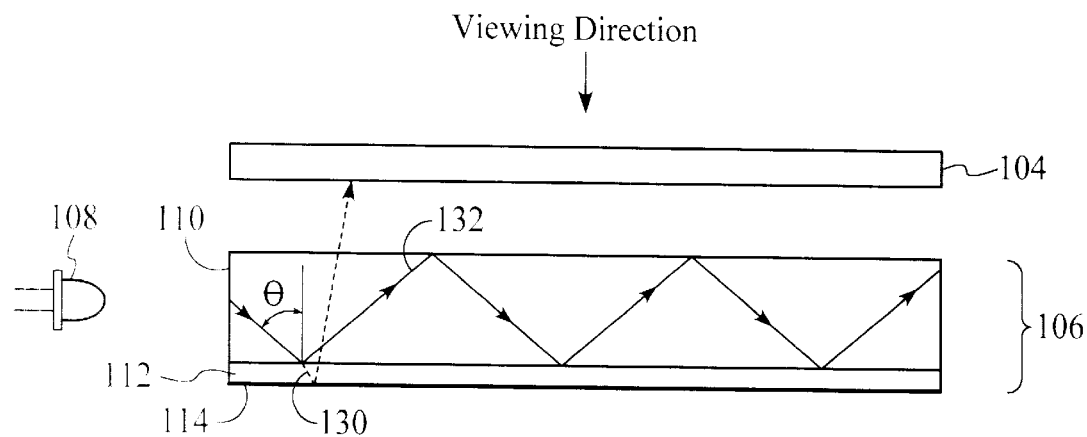
FIG. 1 is a depiction of a prior art flat panel micro-display that includes a transmissive LCD panel located below an edge lit flat panel illumination system.
Figure 2:
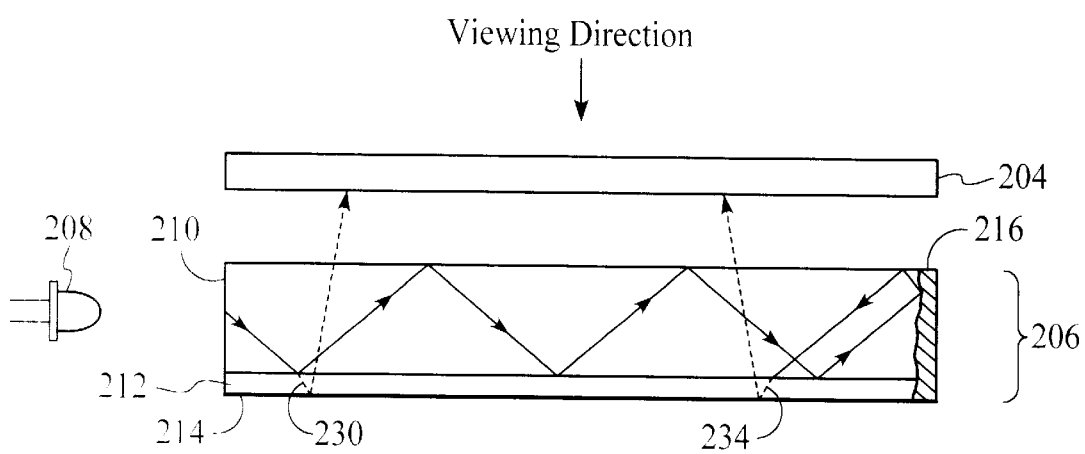
FIG. 2 is a depiction of a prior art flat panel micro-display similar the micro-display of FIG. 1 that includes a depolarizing reflector at an edge face of the flat panel illumination system.
Figure 3:
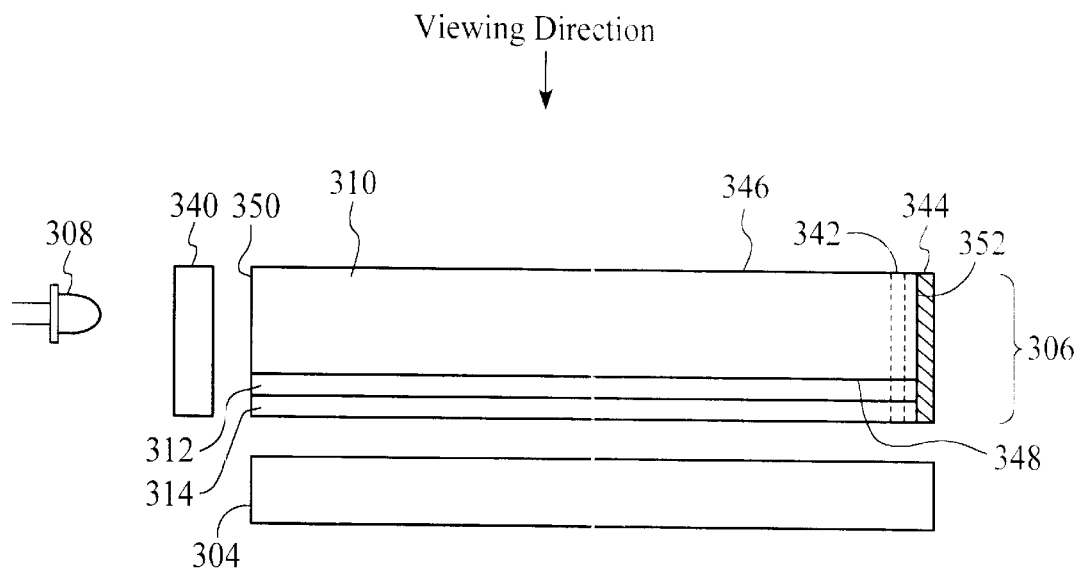
FIG. 3 is a depiction of a flat panel micro-display that includes a reflective LCD panel located below an edge lit flat panel illumination system, with the flat panel illumination system including a quarter wave plate and reflector combination in accordance with an embodiment of the invention.

FIG. 3 is a depiction of a flat panel micro-display system that includes a reflective liquid crystal display (LCD) panel 304 below a flat panel illumination system 306. The flat panel illumination system emits polarized light to the reflective LCD panel in a polarization state that is desired by the reflective LCD panel. In the embodiment of FIG. 3, the flat panel illumination system includes a light source 308, a diffuser 340, an edge lit flat panel lightguide 310, a polarizing system 312 that passes one state of polarization while reflecting the other polarization state, a quarter wave plate 314, a polarization rotator 342, and a reflector 344. Each of the elements of the flat panel display system is described below followed by a description of the operation of the flat panel display system and various alternative embodiments. It should be noted that throughout the description, similar reference numerals are utilized to identify similar elements.

The reflective LCD panel 304 includes conventional LCDs as are known in the field. LCDs operate by selectively applying electrical fields to certain picture elements (pixels) in order to turn the polarization of light that is incident on the picture elements. The polarized light is selectively turned at each picture element such that the light will be reflected (in the case of reflective LCDs) or passed (in the case of transmissive LCDs). By controlling the electrical fields applied to a matrix of pixels within a LCD panel, various graphic images can be displayed. In an embodiment, a ferro-electric liquid crystal (FLC) panel is utilized for the reflective LCD panel. Although a micro-display system utilizing a reflective LCD panel is described, an embodiment utilizing a transmissive LCD panel may be implemented.

The light source 308 of the flat panel illumination system 306 includes one or more light emitting diodes (LEDs) or a fluorescent light source, such as a rod shaped light source, that inject light, typically unpolarized light, into the flat panel lightguide 310. In the embodiment of FIG. 3, the light source is located along an edge face of the flat panel lightguide, the light source may include a light source reflector that maximizes the amount of light that is directed into the edge face of the flat panel lightguide although this is not required. Other light sources may be utilized to illuminate the LCD panel.

The diffuser 340 of the flat panel illumination system 306 diffuses light that enters the flat panel lightguide 310. The diffuser is typically utilized when the light is generated from one or more LEDs. Although the diffuser is shown separate from the lightguide, the diffuser may be integrated into the lightguide.

The edge lit flat panel lightguide 310 of the flat panel illumination system 306 includes a glass or plastic panel having first (top) and second (bottom) major surfaces 346 and 348 and first (left) and second (right) edge face surfaces 350 and 352. In the embodiment of FIG. 3, the second major surface (bottom) of the lightguide is proximate to the reflective LCD panel 304, the first edge face (left) is proximate to the light source 308, and the second edge face (right) is on the opposite side of the lightguide from the light source. In an embodiment, the flat panel lightguide is constructed from a material having isotropic properties although the lightguide may alternatively have anisotropic, or birefringent, properties. As is well known in the field, light propagating within the lightguide at a large enough angle of incidence is internally refracted at the peripheral surfaces of the lightguide and continues to propagate within the lightguide. Light propagating within the lightguide at a small enough angle of incidence exits the lightguide when incident on a peripheral surface of the lightguide.

The polarizing system 312 of the flat panel illumination system 306 includes a polarizing layer such as a fine linear grating or a high angle, high efficiency polarizing beam splitter that is formed proximate to the second (bottom) surface 348 of the flat panel lightguide 310. The polarizing system passes light having a desired polarization state and reflects light having an undesired polarization state. An embodiment of the fine linear grating is formed by molding or etching and an embodiment of the polarizing beam splitter is formed by applying an optical thin film coating or a film layer, such as a commercially available brightness enhancing film (e.g., 3M BEF), to the bottom surface of the flat panel lightguide. In an embodiment, the polarizing system operates to transmit, or pass, light having the desired polarization state while in other embodiments, the polarization system may operate to reflect light having the desired polarization state. Although the embodiment of FIG. 3 has the polarization system on the bottom surface of the flat panel lightguide, the polarization system may alternatively be located opposite to a transmissive LCD panel, with the desired light passing through the polarization system where it is reflected back through the lightguide and to the transmissive LCD panel.

The quarter wave plate 314 of the flat panel illumination system 306 is formed proximate to the polarization system 312 and the bottom surface 348 of the flat panel lightguide. The quarter wave plate helps to compensate for the half wave (90 degrees) polarization rotation that is caused by the reflective LCD panel 304. By adding the quarter wave plate between the polarization system and the reflective LCD panel, light that passes the polarizing system is rotated twice by the quarter wave plate and once by the reflective LCD panel such that all of the light having the desired polarization state that is passed down through the polarization system passes back up through the system after being reflected by the LCD panel.

The polarization rotator 342 of the flat panel illumination system 306 includes a quarter wave plate. In a preferred embodiment, the polarization rotator is formed proximate to the second edge face 352 and perpendicular to the top and bottom major surfaces 346 and 348 of the flat panel lightguide 310. Although it is preferred that the quarter wave plate is perpendicular to the top and bottom major surfaces of the flat panel lightguide, it should be understood that other orientations that accomplish polarization rotation of the reflected portions of light are possible. In an embodiment, the quarter wave plate is formed of different layers having different refractive indices. The quarter wave plate is constructed such that light passing through the quarter wave plate is rotated by a quarter wave. Light that passes through the quarter wave plate twice is rotated by a half wave (90 degrees) such that, for example, S polarized light is changed to P polarized light. Although a quarter wave plate is described, other polarization rotators may be utilized to accomplish the half wave rotation of the polarization state.

The reflector 344 of the flat panel illumination system is formed to reflect the portions of light that are initially reflected by the polarization system. In a preferred embodiment, the reflector is formed on the second edge face 352 of the flat panel lightguide 310 and is perpendicular to the top and bottom major surfaces 346 and 348 of the flat panel lightguide. Although it is preferred that the reflector is perpendicular to the top and bottom major surfaces, it should be understood that other orientations that accomplish light reflection are possible. In a preferred embodiment, the reflector is a polarization maintaining reflector such as a mirror that does not change the polarization state of reflected light.

In an embodiment, a flat panel micro-display system includes a LCD panel and a lightguide having dimensions on the order of 5 mm by 4 mm. Although not shown, the flat panel micro-display system typically includes an optical element such as a magnifier, above the illumination system 306 that magnifies the pixels of the LCD panel 304 so that the intended image can be clearly seen by the human eye from the viewing direction. In an embodiment, a magnification system with multiple lenses may be utilized.

Figure 4:
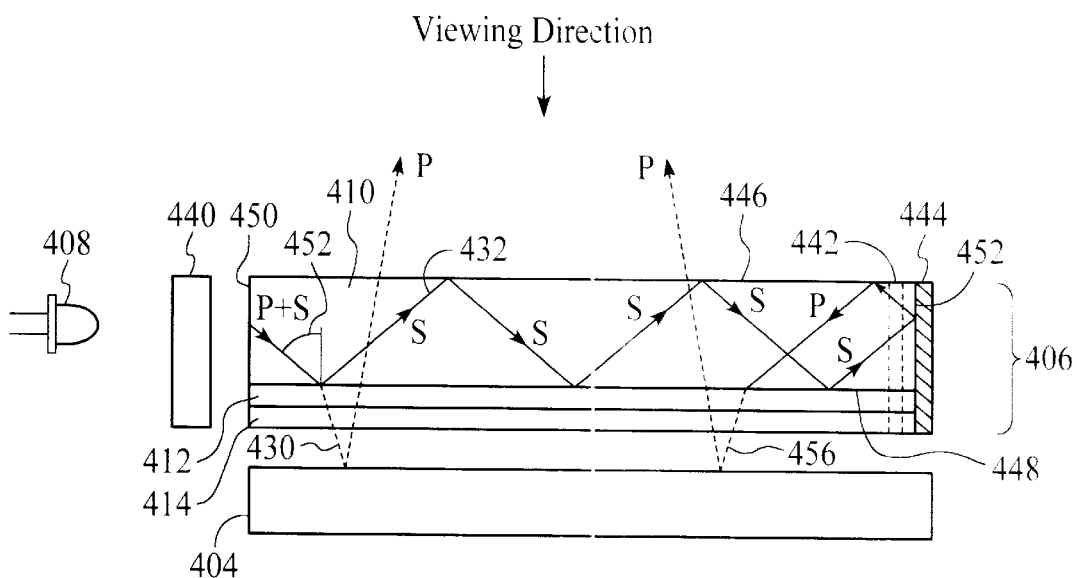
FIG. 4 is a depiction of how light propagates through the flat panel micro-display of FIG. 3 in accordance with an embodiment of the invention.

FIG. 4 is an example depiction of how light propagates through the system of FIG. 3. As shown in FIG. 4, light generated at the light source 408 enters the flat panel lightguide 410 at the first edge face 450, with the light containing nearly equal portions of P polarized and S polarized light. Light that is incident on the polarization system 412 with an angle 452 that is larger than the Total Internal Reflection (TIR) angle defined by Snell's law is either passed by the polarization system or reflected depending on the polarization state. For example purposes, it is assumed that the polarization system is designed to pass P polarized light and reflect S polarized light. As indicated by the dashed line 430, the P polarized light passes through the polarization system and is rotated a quarter wavelength by the quarter wave plate 414. The light is then reflected by the reflective LCD panel 404 and the polarization state of the reflected light is rotated by half a wave in the process. The reflected light travels back up through the quarter wave plate where it is rotated again by a quarter wave back to its original P polarization state. The P polarized light propagates through the polarization system and the flat panel lightguide, as indicated by the dashed line 430, so that it can be seen from the viewing direction.

As indicated by the solid line, 432, that continues from the first point of incidence, the reflected S polarized light continues to be internally reflected as the S polarized light propagates within the lightguide. The S polarized light eventually passes through the quarter wave plate 442 proximate to the second edge face 452 and is rotated by a quarter wave. The rotated light is then reflected by the reflector 444 and passes again through the quarter wave plate where it is rotated by a quarter wavelength. The two rotations and reflection cause the S polarized light that propagates towards the quarter wave plate/reflector combination to propagate away from the quarter wave plate/reflector combination as P polarized light. The P polarized light then propagates through the lightguide 450 and eventually contacts the polarization system 412. The P polarized light that is incident on the polarization system is passed by the polarization system as indicated by the dashed line 456 and is utilized to illuminate the reflective LCD panel 404.

As described above, the reflector 444 is preferably a polarization maintaining reflector so that all of the S polarized light that propagates towards the quarter wave plate/reflector 442 and 444 combination is changed to P polarized light in a controlled manner. Instead of relying on a depolarizing reflector to change a portion of the S polarized light into P polarized light, the quarter wave plate/reflector combination changes all, or nearly all, of the S polarized light into P polarized light, which is then utilized to illuminate the LCD panel 404.

Figure 5:
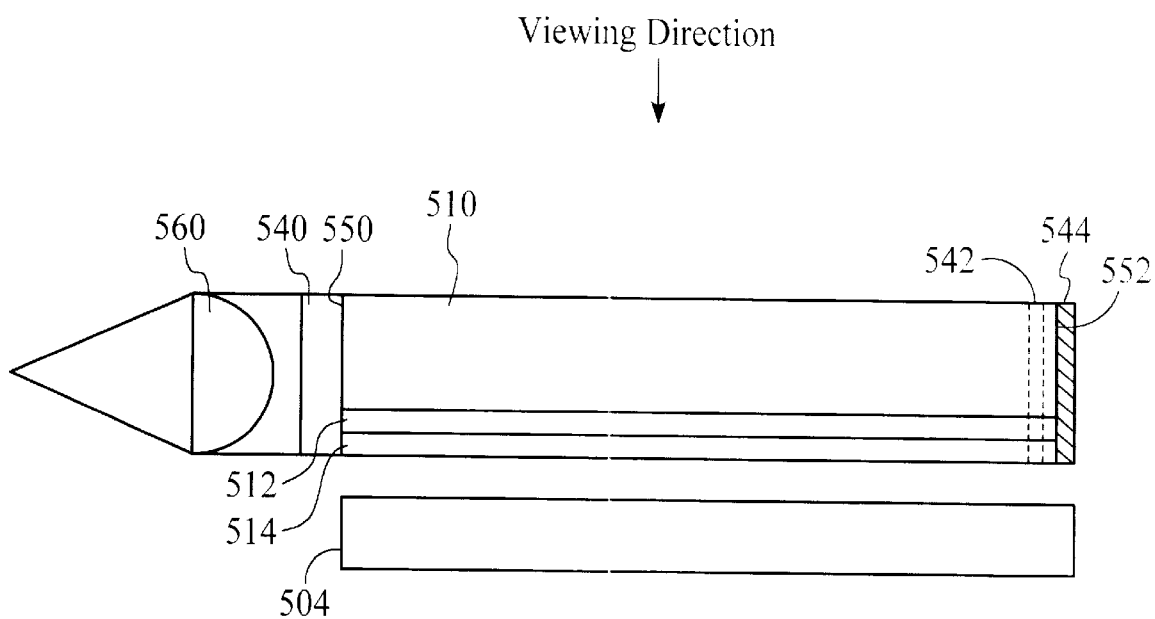
FIG. 5 is a depiction of a flat panel micro-display that includes a reflective LCD panel located below an edge lit flat panel illumination system, with the flat panel illumination system including an integrated collimating lens, an integrated diffuser, and a quarter wave plate and reflector combination in accordance with an embodiment of the invention.

FIG. 5 is a depiction of another embodiment of a flat panel display system that includes the quarter wave plate 542 and reflector 544 combination proximate to the second edge face 552 as described above with reference to FIGS. 3 and 4. In the embodiment of FIG. 5, a collimating lens 560 and diffuser 540 are integrated into the flat panel lightguide 510 at or near the first edge face 550. Although shown as integrated with the flat panel lightguide, the collimating lens and diffuser may be separate from the lightguide or may be used one without the other.

Figure 6:
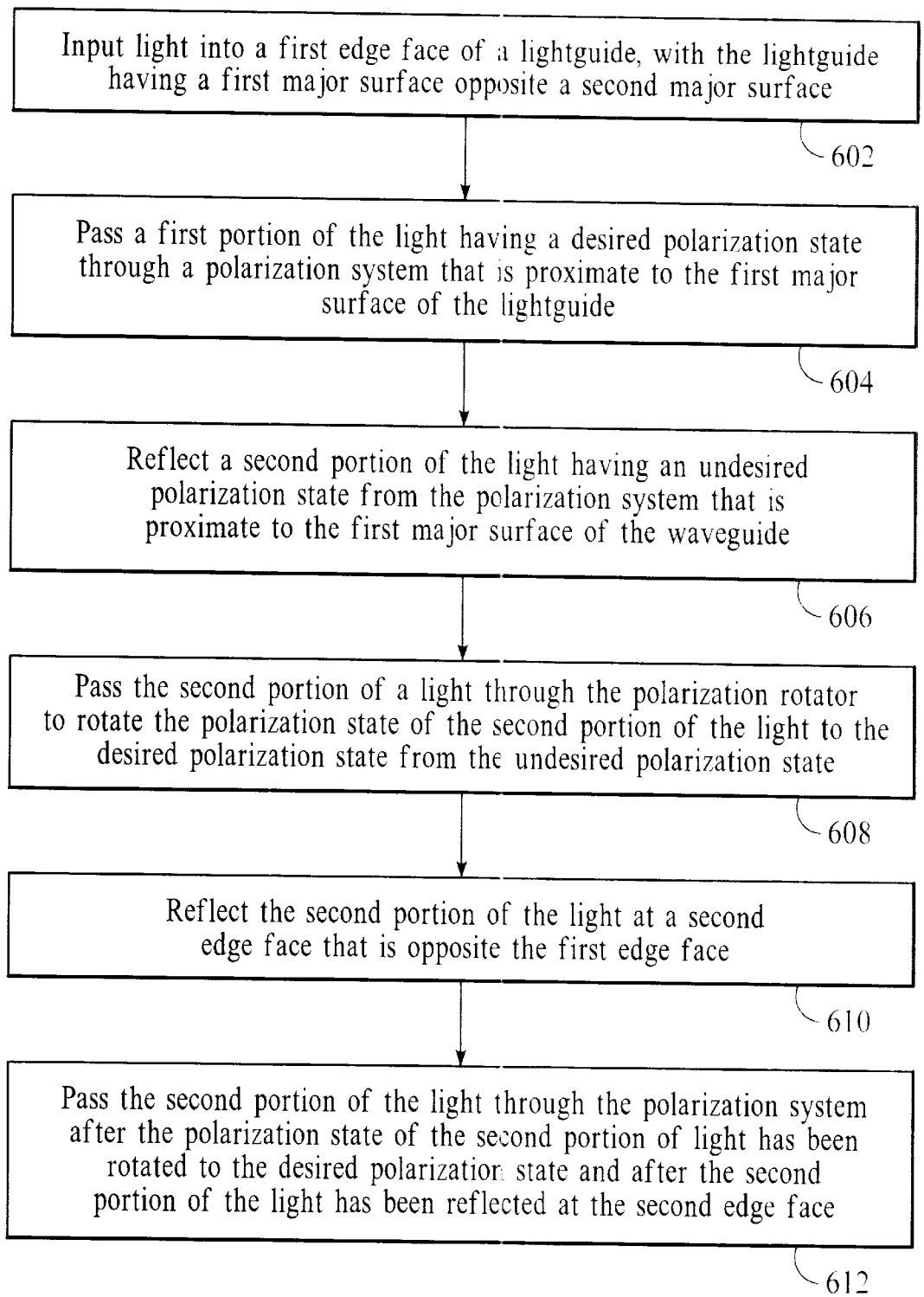
FIG. 6 is a process flow diagram of a method for illuminating a display panel in accordance with an embodiment of the invention.

A method for illuminating a display panel is depicted in the process flow diagram of FIG. 6. In a step 602, light is input into a first edge face of a lightguide, with the lightguide having a first major surface opposite a second major surface. In a step 604, a first portion of the light having a desired polarization state is passed through a polarization system that is proximate to the first major surface of the waveguide. In a step 606, a second portion of the light having an undesired polarization state is reflected from the polarization system that is proximate to the first major surface of the waveguide. In a step 608, the second portion of the light is passed through a polarization rotator to rotate the polarization state of the second portion of the light to the desired polarization state from the undesired polarization state. In a step 610, the second portion of the light is reflected at a second edge face that is opposite the first edge face. In a step 612, the second portion of the light is passed through the polarization system after the polarization state of the second portion of light has been rotated to the desired polarization state and after the second portion of the light has been reflected at the second edge face.

What is claimed is:

1. An illumination system for a display device comprising:
    a lightguide having a first major surface opposite a second major surface and a first edge face opposite a second edge face, said first edge face being positioned to receive light from a light source;
    a polarizing system proximate to said second major surface which passes a first portion of said light having a desired polarization state to a reflective liquid crystal display panel and which reflects a second portion of said light having an undesired polarization state; and
    means, integrated with said lightguide, for reflecting said second portion of said light at said second edge face and for rotating the polarization state of said second portion of said light from said undesired polarization state to said desired polarization state, wherein said second portion of said light having said desired polarization state is incident on said polarizing system and is passed to said reflective liquid crystal display panel.

2. The illumination system of claim 1 wherein said means for reflecting and rotating includes a mirror.

3. The illumination system of claim 2 wherein said mirror is a polarization maintaining mirror.

4. The illumination system of claim 2 wherein said mirror is proximate to said second edge face.

5. The illumination system of claim 4 wherein said mirror is substantially perpendicular to said first and second major surfaces of said lightguide.

6. The illumination system of claim 1 wherein said means for reflecting and rotating includes a quarter wave plate.

7. The illumination system of claim 6 wherein said quarter wave plate is proximate to said second edge face.

8. The illumination system of claim 7 wherein said quarter wave plate is substantially perpendicular to said first and second major surfaces of said lightguide.

9. The illumination system of claim 6 wherein said second portion of said light is passed through said quarter wave plate twice to rotate the polarization state of said second portion of said light by one half a wave.

10. The illumination system of claim 1 wherein said means for reflecting and rotating includes a mirror and a quarter wave plate proximate to said second edge face.

11. The illumination system of claim 10 wherein said mirror and said quarter wave plate are substantially perpendicular to said first and second major surfaces.

12. The illumination system of claim 11 further including a second quarter wave plate proximate to said polarization system and to said second major surface of said lightguide.

13. The illumination system of claim 1 wherein said lightguide is a flat panel lightguide.

14. The illumination system of claim 1 further including a diffuser proximate to said first edge face.

15. The illumination system of claim 1 wherein said lightguide includes an integrated collimating lens for collimating light received from said light source.

16. A method for illuminating a display device comprising the steps of:
    inputting light into a first edge face of a lightguide, said lightguide having a first major surface opposite a second major surface;
    passing a first portion of said light having a desired polarization state through a polarization system that is proximate to said second major surface of said lightguide;
    reflecting a second portion of said light having an undesired polarization state from said polarization system that is proximate to said second major surface of said lightguide;
    passing said second portion of said light through a polarization rotator to rotate the polarization state of said second portion of said light to said desired polarization state from said undesired polarization state;
    reflecting said second portion of said light at a second edge face that is opposite said first edge face;
    passing said second portion of said light through said polarization system after the polarization state of said second portion of light has been rotated to said desired polarization state and after said second portion of said light has been reflected at said second edge face;
    outputting, to a liquid crystal display panel, said first and second portions of said light having said desired polarization state after said portions are passed through said polarization system; and
    passing said output first and second portions of said light through a quarter wave plate that is located between said polarization system and said liquid crystal display panel.

17. The method of claim 16 wherein said step of passing said second portion of said light through a polarization rotator including a step of passing said second portion of said light twice through a quarter wave plate.

18. An illumination system for a display device comprising:
    a lightguide having a first major surface opposite a second major surface and a first edge face opposite a second edge face, said first edge face being positioned to receive light from a light source;
    a polarizing system proximate to said second major surface which passes a first portion of said light having a desired polarization state to a display panel and which reflects a second portion of said light having an undesired polarization state;
    a first quarter wave plate proximate to said polarization system and to said second major surface of said lightguide; and
    means, integrated with said lightguide, for reflecting said second portion of said light at said second edge face and for rotating the polarization state of said second portion of said light from said undesired polarization state to said desired polarization state, wherein said second portion of said light having said desired polarization state is incident on said polarizing system and is passed to said display panel.

19. The illumination system of claim 18 wherein said means for reflecting and rotating includes a mirror.

20. The illumination system of claim 19 wherein said mirror is a polarization maintaining mirror.

21. The illumination system of claim 19 wherein said mirror is proximate to said second edge face.

22. The illumination system of claim 21 wherein said mirror is substantially perpendicular to said first and second major surfaces of said lightguide.

23. The illumination system of claim 18 wherein said means for reflecting and rotating includes a second quarter wave plate.

24. The illumination system of claim 23 wherein said second quarter wave plate is proximate to said second edge face.

25. The illumination system of claim 24 wherein said second quarter wave plate is substantially perpendicular to said first and second major surfaces of said lightguide.

26. The illumination system of claim 23 wherein said second portion of said light is passed through said second quarter wave plate twice to rotate the polarization state of said second portion of said light by one half a wave.

27. The illumination system of claim 18 wherein said means for reflecting and rotating includes a mirror and a second quarter wave plate proximate to said second edge face.

28. The illumination system of claim 27 wherein said mirror and said second quarter wave plate are substantially perpendicular to said first and second major surfaces.

29. The illumination system of claim 18 wherein said display panel is a reflective liquid crystal display panel.

30. The illumination system of claim 18 wherein said lightguide is a flat panel lightguide.

31. The illumination system of claim 18 further including a diffuser proximate to said first edge face.

32. The illumination system of claim 18 wherein said lightguide includes an integrated collimating lens for collimating light received from said light source.

* * * * *